United States Patent
Marum et al.

(10) Patent No.: US 8,515,942 B2
(45) Date of Patent: *Aug. 20, 2013

(54) SYSTEM AND METHOD FOR GENERATING DYNAMIC QUERIES

(75) Inventors: Matthew Gordon Marum, Cary, NC (US); Ravi Gopalakrishnan, Cary, NC (US); Nirav S. Sheth, Cary, NC (US); Michael John Tabb, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 180 days.

This patent is subject to a terminal disclaimer.

(21) Appl. No.: 12/826,058

(22) Filed: Jun. 29, 2010

(65) Prior Publication Data

US 2011/0320410 A1  Dec. 29, 2011

(51) Int. Cl.
*G06F 17/30* (2006.01)

(52) U.S. Cl.
USPC .......................... 707/713; 707/759; 707/769

(58) Field of Classification Search
USPC ........................................ 707/713, 759, 769
See application file for complete search history.

(56) References Cited

U.S. PATENT DOCUMENTS

| | | |
|---|---|---|
| 6,651,054 B1 | 11/2003 | de Judicibus |
| 2003/0200214 A1* | 10/2003 | Doole et al. ................ 707/8 |
| 2005/0234872 A1* | 10/2005 | Torge et al. ................ 707/3 |
| 2005/0289100 A1* | 12/2005 | Dettinger et al. ........... 707/1 |
| 2006/0161528 A1 | 7/2006 | Dettinger et al. |
| 2006/0294089 A1* | 12/2006 | Devost et al. .............. 707/4 |
| 2008/0133479 A1 | 6/2008 | Zelevinsky et al. |
| 2009/0099999 A1 | 4/2009 | Warren |
| 2009/0216714 A1* | 8/2009 | Gonzalez et al. ........... 707/3 |
| 2010/0057811 A1 | 3/2010 | Dettinger et al. |
| 2010/0094892 A1* | 4/2010 | Bent et al. ................ 707/760 |

* cited by examiner

*Primary Examiner* — Mahesh Dwivedi
(74) *Attorney, Agent, or Firm* — Holland & Knight LLP; Brian J. Colandreo, Esq.; Jeffrey T. Placker, Esq.

(57) ABSTRACT

A first query is retrieved by a computing device. A second query is retrieved by the computing device, wherein the second query is linked to the first query. A derivative query is generated by the computing device based, at least in part, upon merging at least a portion of the second query with at least a portion of the first query, wherein generating the derivative query includes retrieving the first query and the second query prior to generation of the derivative query. The computing device determines whether the derivative query contains one or more conflicts. If it is determined that the derivative query contains one or more conflicts, the one or more conflicts in the derivative query are resolved by the computing device.

14 Claims, 6 Drawing Sheets

Development Manager Query 452

| Component 456 | CQEC || CQ Designer 458 460 |
|---|---|

Developer Query 552

| Component 556 | CQEC || CQ Designer 558 560 |
|---|---|
| Owner 562 | John 564 |

| Derivative Development Manager Query 652 | |
|---|---|
| Product 656 | ClearQuest 658 |
| Release 660 | 7.1.1 662 |
| Component 664 | CQEC 666 |
| Owner 668 | John 670 |

FIG. 8

SYSTEM AND METHOD FOR GENERATING DYNAMIC QUERIES

TECHNICAL FIELD

This disclosure relates to queries and, more particularly, to a system and method of dynamically generating queries.

BACKGROUND

Conventional change management systems may be used to define outstanding or completed work for a given release or iteration of, e.g., a software product. Reports relevant to such work often contain data across multiple software products that involve multiple, unrelated, software development teams each with their own interests. Traditionally, the leader of each such software development team may scour through those reports to identify items of interest to their team, or may create a copy of the query used to derive the report and add additional filters to return results relevant to their team. This may lead to a condition where relevant results may be overlooked, or where time may not be efficiently utilized. It may often be useful for a change management system to provide a more reliable and efficient approach to generating queries.

SUMMARY OF DISCLOSURE

According to a first implementation, a computer-implemented method includes retrieving, by a computing device, a first query. A second query is retrieved by the computing device, wherein the second query is linked to the first query. A derivative query is generated by the computing device based, at least in part, upon merging at least a portion of the second query with at least a portion of the first query, wherein generating the derivative query includes retrieving the first query and the second query prior to generation of the derivative query. The computing device determines whether the derivative query contains one or more conflicts. If it is determined that the derivative query contains one or more conflicts, the one or more conflicts in the derivative query are resolved by the computing device.

One or more of the following features may be included. One or more of the first query, the second query, and the derivative query may include one or more filters. The determination, by the computing device, whether the derivative query contains one or more conflicts may include determining, by the computing device, whether one or more of the one or more filters of the second query may be incompatible with one or more of the one or more filters of the first query.

Resolving the one or more conflicts in the derivative query by the computing device may include selecting, by the computing device, one or more of the one or more filters of the second query and the one or more filters of the first query based, at least in part, upon a priority measure. The priority measure may assign priority to the one or more filters of the second query.

The derivative query may be executed by the computing device, wherein executing the derivative query may generate a result set. The computing device may store one or more of the first query, the second query, and the derivative query.

According to another implementation, a computer program product includes a computer readable medium having a plurality of instructions stored on it. When executed by a processor, the instructions cause the processor to perform operations including retrieving a first query. A second query is retrieved, wherein the second query is linked to the first query. A derivative query is generated based, at least in part, upon merging at least a portion of the second query with at least a portion of the first query, wherein generating the derivative query includes retrieving the first query and the second query prior to generation of the derivative query. It is determined whether the derivative query contains one or more conflicts. If it is determined that the derivative query contains one or more conflicts, the one or more conflicts in the derivative query are resolved.

One or more of the following features may be included. One or more of the first query, the second query, and the derivative query may include one or more filters. The determination, by the computing device, whether the derivative query contains one or more conflicts may include determining whether one or more of the one or more filters of the second query may be incompatible with one or more of the one or more filters of the first query.

Resolving the one or more conflicts in the derivative query by the computing device may include selecting one or more of the one or more filters of the second query and the one or more filters of the first query based, at least in part, upon a priority measure. The priority measure may assign priority to the one or more filters of the second query.

The derivative query may be executed, wherein executing the derivative query may generate a result set. One or more of the first query, the second query, and the derivative query may be stored.

According to yet another implementation, a computing system includes a processor and a memory module coupled with the processor. A first software module is executable by the processor and the memory module. The first software module is configured to retrieve a first query. A second software module is executable by the processor and the memory module. The second software module is configured to retrieve a second query, wherein the second query is linked to the first query. A third software module is executable by the processor and the memory module. The third software module is configured to generate a derivative query based, at least in part, upon merging at least a portion of the second query with at least a portion of the first query, wherein generating the derivative query includes retrieving the first query and the second query prior to generation of the derivative query. A fourth software module is executable by the processor and the memory module. The fourth software module is configured to determine whether the derivative query contains one or more conflicts. If the fourth software module determines that the derivative query contains one or more conflicts, a fifth software module is executable by the processor and the memory module. The fifth software module is configured to resolve the one or more conflicts in the derivative query.

One or more of the following features may be included. One or more of the first query, the second query, and the derivative query may include one or more filters. The fourth software module configured to determine whether the derivative query contains one or more conflicts may be further configured to determine whether one or more of the one or more filters of the second query may be incompatible with one or more of the one or more filters of the first query.

The fifth software module configured to resolve the one or more conflicts in the derivative query may be further configured to select one or more of the one or more filters of the second query and the one or more filters of the first query based, at least in part, upon a priority measure. The priority measure may assign priority to the one or more filters of the second query.

A sixth software module may be executable by the processor and the memory module. The sixth software module may be configured to execute the derivative query, wherein executing the derivative query generates a result set. A seventh software module may be executable by the processor and the memory module. The seventh software module may be configured to store one or more of the first query, the second query, and the derivative query.

The details of one or more implementations are set forth in the accompanying drawings and the description below. Other features and advantages will become apparent from the description, the drawings, and the claims.

BRIEF DESCRIPTION OF THE DRAWINGS

FIG. 6 diagrammatically depicts a query that may be utilized by the dynamic query process of FIG. 1.

FIG. 7 diagrammatically depicts a query that may be utilized by the dynamic query process of FIG. 1.

FIG. 8 diagrammatically depicts a query that may be utilized by the dynamic query process of FIG. 1.

DETAILED DESCRIPTION OF EXEMPLARY EMBODIMENTS

Figure 1:
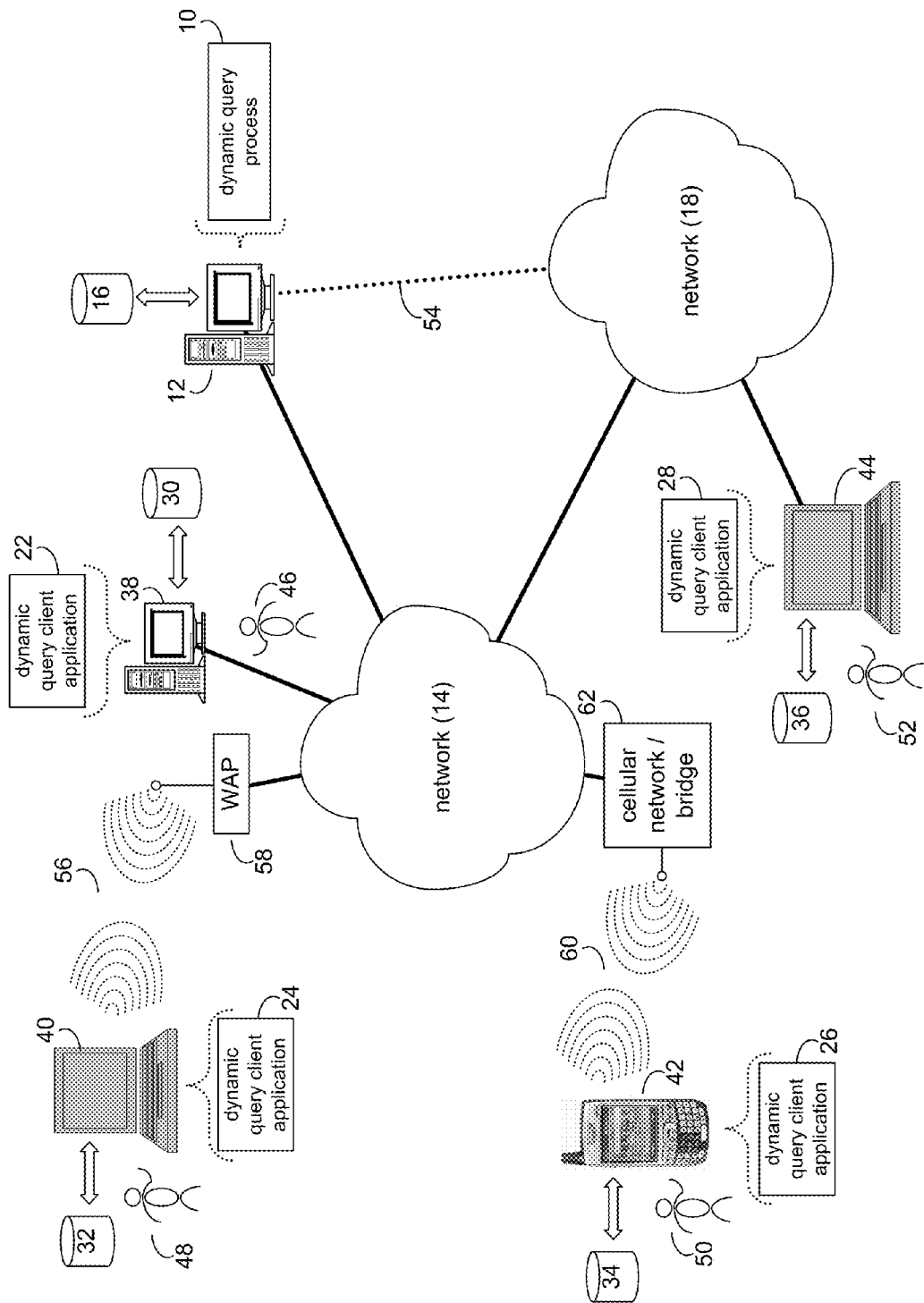
FIG. 1 diagrammatically depicts a dynamic query process coupled to a distributed computing system.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring to FIG. 1, there is shown dynamic query process 10 that may reside on and may be executed by server computer 12, which may be connected to network 14 (e.g., the Internet or a local area network). Examples of server computer 12 may include, but are not limited to: a personal computer, a handheld computer (e.g., a PDA), a server computer, a series of server computers, a mini computer, and a mainframe computer. Server computer 12 may be a database server (or a series of servers) running a network operating system, examples of which may include but are not limited to: Microsoft® Windows® Server; Novell® Netware®; or Red Hat® Linux®, for example (Microsoft and Windows are registered trademarks of Microsoft Corporation in the United States, other countries, or both; Novell and NetWare are registered trademarks of Novell Corporation in the United States, other countries, or both; Red Hat is a registered trademark of Red Hat Corporation in the United States, other countries, or both; and Linux is a registered trademark of Linus Torvalds in the United States, other countries, or both). Network 14 may be connected to one or more secondary networks (e.g., network 18), examples of which may include but are not limited to: a local area network; a wide area network; or an intranet, for example.

As will be discussed below in greater detail, dynamic query process 10 may retrieve a first query. Dynamic query process 10 may retrieve a second query, wherein the second query may be linked to the first query. Further, dynamic query process 10 may generate a derivative query based, at least in part, upon merging at least a portion of the second query with at least a portion of the first query, wherein generating the derivative query may include retrieving the first query and the second query prior to generation of the derivative query. Dynamic query process 10 may determine whether the derivative query contains one or more conflicts. Finally, dynamic query process 10 may resolve the one or more conflicts in the derivative query if it is determined that the derivative query contains one or more conflicts.

The instruction sets and subroutines of dynamic query process 10, which may be configured as one or more software modules, and which may be stored on storage device 16 coupled to server computer 12, may be executed by one or more processors (not shown) and one or more memory modules (not shown) incorporated into server computer 12. Storage device 16 may include but is not limited to: a hard disk drive; a solid state drive; a tape drive; an optical drive; a RAID array; a random access memory (RAM); and a read-only memory (ROM).

For the purpose of the following description, server computer 12 may be discussed. However, this is for illustrative purposes only and should not be construed as a limitation of the present disclosure, as one of skill in the art will appreciate that any computing device capable of performing the functions of dynamic query process 10 may be utilized.

The instruction sets and subroutines of dynamic query client applications 22, 24, 26, 28, which may be configured as one or more software modules, and which may be stored on storage devices 30, 32, 34, 36 (respectively) coupled to client electronic devices 38, 40, 42, 44 (respectively), may be executed by one or more processors (not shown) and one or more memory modules (not shown) incorporated into client electronic devices 38, 40, 42, 44 (respectively). Storage devices 30, 32, 34, 36 may include but are not limited to: hard disk drives; solid state drives; tape drives; optical drives; RAID arrays; random access memories (RAM); read-only memories (ROM), compact flash (CF) storage devices, secure digital (SD) storage devices, and memory stick storage devices. Examples of computing devices 38, 40, 42, 44 may include, but are not limited to, personal computer 38, laptop computer 40, personal digital assistant 42, notebook computer 44, a data-enabled, cellular telephone (not shown), and a dedicated network device (not shown), for example. Using dynamic query client applications 22, 24, 26, 28, users 46, 48, 50, 52 may, for example, dynamically merge multiple queries.

Users 46, 48, 50, 52 may access dynamic query process 10 directly through the device on which the client application (e.g., dynamic query client applications 22, 24, 26, 28) is executed, namely client electronic devices 38, 40, 42, 44, for example. Users 46, 48, 50, 52 may access dynamic query process 10 directly through network 14 or through secondary network 18. Further, server computer 12 (i.e., the computer that executes dynamic query process 10) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11n, 802.11g, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft® Windows®, Microsoft Windows CE®, Red Hat® Linux®, or a custom operating system (Windows CE is a registered trademark of Microsoft Corporation in the United States, other countries, or both).

For the purpose of the following description, dynamic query client application 22 may be discussed. However, this is for illustrative purposes only and should not be construed as a limitation of the present disclosure, as other client applications (e.g., dynamic query client applications 24, 26, 28) may be equally utilized.

Figure 2:
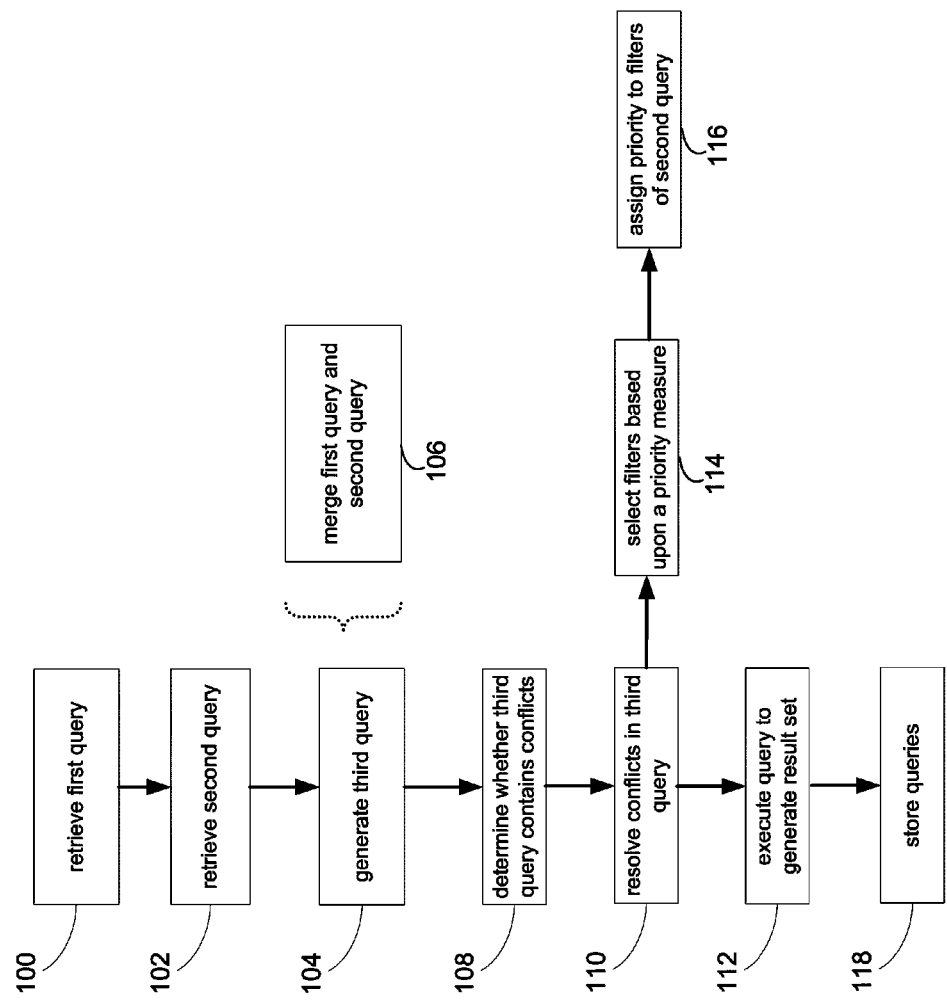
FIG. 2 is a flow chart of a process performed by the dynamic query process of FIG. 1.

Referring also to FIG. 2, dynamic query process 10 may retrieve 100 (via, e.g., server computer 12) a first query. Dynamic query process 10 may also retrieve 102 a second query, wherein the second query may be linked to the first query. Further, dynamic query process 10 may generate 104 a derivative query based, at least in part, upon merging 106 at least a portion of the second query with at least a portion of the first query, wherein generating 104 the derivative query may include retrieving 100/102 the first query and the second query prior to generation 104 of the derivative query. Dynamic query process 10 may determine 108 whether the derivative query contains one or more conflicts. Finally, dynamic query process 10 may resolve 110 the one or more conflicts in the derivative query if it is determined 108 that the derivative query contains one or more conflicts.

Figure 3:
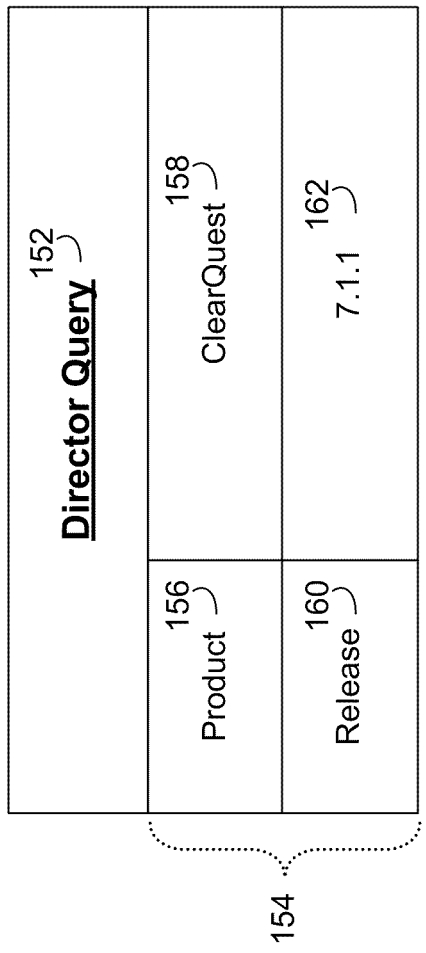
FIG. 3 diagrammatically depicts a query that may be utilized by the dynamic query process of FIG. 1.

Referring also to FIG. 3, dynamic query process 10 may retrieve 100 (via a computing device, e.g., server computer 12) a first query (e.g., first query 150). That is, dynamic query process 10 (via, e.g., server computer 12) may access storage device 16 to retrieve 100 first query 150. Dynamic query process 10 may also enable first query 150 to be defined, at least in part, by the user (e.g., user 46) that created first query 150. For example, if, e.g., user 46 was, e.g., a director of a software development team, first query 150 may be titled by the position of user 46 (e.g., Director Query 152). This is not intended to be a limitation of the present disclosure, however, as one of skill in the art will appreciate that any reference suitable to identify first query 150 may be utilized (e.g., combinations of alphanumeric and non-alphanumeric characters, pointers, links, etc.).

Additionally, first query 150 may include one or more filters (e.g., filters 154). Dynamic query process 10 may enable such filters to be defined by, e.g., user 46 to identify data of interest. For example, product filter 156 may define the specific software product (e.g., ClearQuest 158) in which user 46 (e.g., the software development team director) is interested. Similarly, e.g., release filter 160 may be utilized to define the version of the software product in which user may be interested (e.g., 7.1.1 162). Thus, for example, utilizing one or more filters 154 generally (e.g., which may include product filter 156, and release filter 160), user 46 may build first query 150 to be used within, e.g., a change management system to report on outstanding and/or completed work for a given release or iteration of a software product.

Figure 4:
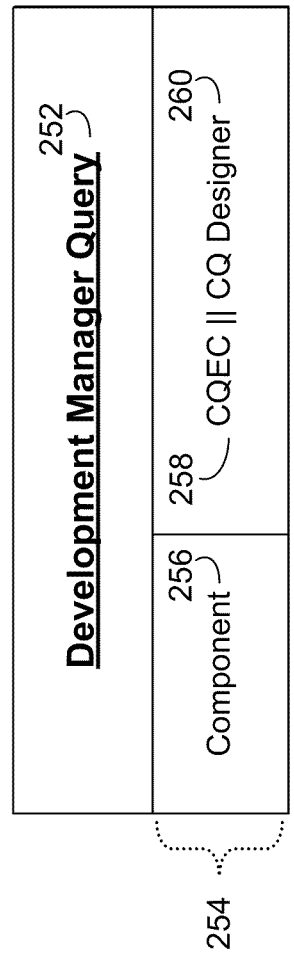
FIG. 4 diagrammatically depicts a query that may be utilized by the dynamic query process of FIG. 1.

Referring also to FIG. 4, dynamic query process 10 may retrieve 102 (via a computing device, e.g., server computer 12) a second query (e.g., second query 250). Similar to first query 150, dynamic query process 10 (via, e.g., server computer 12) may access storage device 16 to retrieve 102 second query 250. Dynamic query process 10 may also enable second query 250 to be defined, at least in part, by the user (e.g., user 48) that created second query 250. For example, if, e.g., user 48 was, e.g., a development manager of a software development team, second query 250 may be titled by the position of user 48 (e.g., Development Manager Query 252). This is not intended to be a limitation of the present disclosure, however, as one of skill in the art will appreciate that any reference suitable to identify second query 250 may be utilized (e.g., combinations of alphanumeric and non-alphanumeric characters, pointers, links, etc.).

Additionally, second query 250 may include one or more filters (e.g., filters 254). Dynamic query process 10 may enable such filters to be defined by, e.g., user 48 to identify data of interest. For example, component filter 256 may define one or more components of a specific software product in which user 48 (e.g., one of the software development team's development managers) may be interested. Illustratively, in the present example, user 48 (e.g., the development manager) has identified two components that may be of interest, namely, CQEC 258 and CQ Designer 260. This is not intended to be a limitation of the present disclosure, however, as one of skill in the art will appreciate that any number or types of components may be defined by dynamic query process 10 (e.g., ClearQuest Bridge, ClearQuest MultiSite, etc.).

Moreover, dynamic query process 10 may enable the second query (e.g., second query 250) to be linked to the first query (e.g., first query 150). That is, via any means known to one of skill in the art (e.g., utilizing pointers, shortcuts, hyperlinks, references, etc.), dynamic query process 10 may enable, e.g., second query 250 to be associated with the query embodied by, e.g., first query 150. Illustratively, and continuing with the above-stated example, due to the hierarchical nature of the development manager (i.e., user 48) and the director (i.e., user 46), second query 250 (i.e., Development Manager Query 252) may be linked to first query 150 (i.e., Director Query 152). In the context of a software development environment, for example, this linking may be useful as it may enable each user in the development chain to create a query relevant to its responsibilities based upon the responsibilities of the directly senior user.

Figure 5:
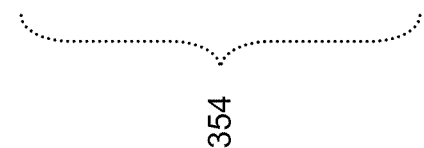
FIG. 5 diagrammatically depicts a query that may be utilized by the dynamic query process of FIG. 1.

Referring also to FIG. 5, dynamic query process 10 may also generate 104 a derivative query (e.g., derivative query 350) based, at least in part, upon merging 106 at least a portion of the second query (e.g., second query 250) with at least a portion of the first query (e.g., first query 150), wherein generating 104 the derivative query may include retrieving 100/102 the first query and the second query prior to generation 104 of the derivative query. Additionally, the derivative query (e.g., derivative query 350) may include one or more filters (e.g., filters 354). Due to the linked nature of, e.g., second query 250 and first query 150, dynamic query process 10 may generate 104, e.g., derivative query 350 by merging 106 those queries. However, prior to generation 104 of derivative query 350, dynamic query process 10 may (as described above; via, e.g., server computer 12) access storage device 16 to retrieve 102 second query 250 and retrieve 100 first query 150. This process of retrieving 100/102 queries prior to generation 104 of a derivative query may ensure that earlier queries (i.e., queries from which the derivative query may depend) have not changed, since the most current definition for the earlier queries may be retrieved 100/102 for each execution (e.g., the generation of a result set based upon a query, which will be described in greater detail below).

This functionality may become even more significant in view of the hierarchical nature of the queries. For example, dynamic query process 10 may be utilized to enable users (e.g., users 46, 48) to, e.g., add/remove/change filters of queries at any level of the hierarchy without risk of implementing stale filters and, thus, generating an irrelevant and/or incomplete result set.

As mentioned above, dynamic query process 10 may generate 104, e.g., derivative query 350 by merging 106 at least a portion of second query 250 with at least a portion of first query 150. As is known in the art, merging 106 may include the combining of one or more filters of a first query with one or more filters of a second query. For example, and referring again to FIG. 5, derivative query 350 (e.g., Derivative Development Manager Query 352) may be generated 104 by merging 106 filters 154 of first query 150 (i.e., product filter 156 and release filter 160) with filters 254 of second query 250 (i.e., component filter 256). As will be discussed in greater detail below, because this example does not implicate a conflict, filters 354 of derivative query 350 may simply be combined. Thus, in this example, the combined filters (i.e., filters 354) of derivative query 350 may include: product filter 356, release filter 358, and component filter 360.

Accordingly, in the present example, filters 354 of derivative query 350 may include the filters of the director (e.g., filters 154) as well as the filters of the development manager (e.g., filters 254), even though the development manager may not have created the same filters identified by the director. This may be due to the linked nature of the queries. Further, as a result of the lack of conflict in this example, dynamic query process 10 may enable product filter 356 of derivative query 350 to define the specific software product (e.g., ClearQuest 362) in which the director—and, thus, the development manager—may be interested. Similarly, e.g., release filter 358 may be utilized to define the version of the software product in which those users may be interested (e.g., 7.1.1 364). Finally, e.g., component filter 360 may define the two components (e.g., CQEC 366 or CQ Designer 368) in which the development manager may be interested.

Assuming that no conflicts exist (which will be discussed in greater detail below), dynamic query process 10 may execute 112 the derivative query (e.g., derivative query 350)

to generate a result set. Illustratively, executing 112 a derivative query (e.g., derivative query 350) by dynamic query process 10 may include, but is not limited to, dynamic query process 10 interfacing with, e.g., storage device 16 (where, e.g., a SQL database may be maintained) via, e.g., server computer 12 to identify data consistent with the one or more filters (e.g., filters 354) of derivative query 350. Thus, in the above-stated example, if dynamic query process 10 executed 112 derivative query 350 to generate a result set (not shown), e.g., user 48 (e.g., the development manager) may receive a result set that may be filtered by ClearQuest 362, 7.1.1 364, and CQEC 366 or CQ Designer 368.

Referring also to FIGS. 6-8, dynamic query process 10 may determine 108 whether the derivative query contains one or more conflicts. Similar to the example discussed above with respect to FIGS. 3-5, dynamic query process 10 may retrieve 100 a first query (e.g., first query 450) and a second query (e.g., second query 550), wherein second query 550 may be linked to first query 450. In this example, however, the queries will be discussed from the perspective of a user (e.g., user 52) that may be one level lower in the exemplary software development hierarchy discussed above. Thus, first query 450 (e.g., Development Manager Query 452) may include one or more filters (e.g., filters 454), which may include, for example: component filter 456 (that may define, e.g., CQEC 458 and CQ Designer 460). Additionally, second query 550 (e.g., Developer Query 552) may include one or more filters (e.g., filters 554), which may include, for example: component filter 556 (that may define, e.g., CQEC 558 and 560), and owner filter 562 (that may define, e.g., John 564).

Continuing with the above-stated example, in determining 108 whether the generated 104 derivative query 650 contains one or more conflicts, dynamic query process 10 may determine 108 whether one or more of the one or more filters (e.g., filters 554) of the second query (e.g., second query 550) may be incompatible with one or more of the one or more filters (e.g., filters 454) of the first query (e.g., first query 450). For example, the query of the development manager may include component filter 456 defined as CQEC 458 and CQ Designer 460. Dynamic query process may determine 108 that this may be incompatible with the query of the developer, which may include component filter 556 defined as CQEC 558 and 560. If dynamic query process 10 determines 108 that the derivative query (e.g., derivative query 650) contains one or more conflicts, the one or more conflicts in the derivative query may be resolved 110 by dynamic query process 10.

Resolving 110 the one or more conflicts in the derivative query (e.g., derivative query 650) by dynamic query process 10 may include selecting 114 one or more of the one or more filters (e.g., filters 554) of the second query (e.g., second query 550) and the one or more filters (e.g., filters 454) of the first query (e.g., first query 454) based, at least in part, upon a priority measure. For example, dynamic query process 10 may enable users (e.g., user 48) to establish a priority measure that may require any conflicts to be resolved in favor of the user that may be higher in the hierarchy of users. In the present example, such a priority measure may cause dynamic query process 10 to generate 104 derivative query 650 such that component filter 556 560 may be included in the one or more filters (e.g., filters 654) of derivative query 650 (not shown).

Additionally/alternatively, dynamic query process 10 may define the priority measure by assigning 116 priority to the one or more filters (e.g., filters 554) of the second query (e.g., second query 550). Continuing with the present example in which user 52 (e.g., the developer) may have utilized dynamic query process 10 to indicate a lack of interest in data relevant to the "CQ Designer" component (i.e., by defining component filter 556 with 560). Accordingly, dynamic query process 10 may assign 116 priority to component filter 556 560 due to its status as being included within, e.g., second query 550. This may ensure that the particular user that may be utilizing dynamic query process 10 may be provided with the data of interest to them.

Thus, applying the assignment 116 of priority to filters 554 of second query 550 to the current example, dynamic query process 10 may generate 104 derivative query 650 to include: product filter 656 (that may define, e.g., ClearQuest 658); release filter 660 (that may define, e.g., 7.1.1 662); component filter 664 (that may define, e.g., CQEC 666); and owner filter 668 (that may define, e.g., John 670). As one of skill in the art will appreciate, component filter 664 of derivative query 650 may not include 560 because dynamic query process 10 may have resolved 110 the conflict in favor of second query 550. Additionally, one of skill in the art will also appreciate that, due to the linked nature of the hierarchical queries, the filters of, e.g., the director (e.g., product filter 156 and release filter 160) may also be included in the generation 104 of derivative query 650.

Moreover, and similar to that described above with respect to derivative query 350, dynamic query process 10 may execute 112 derivative query 650 to generate a result set. Due to the resolution 110 of the conflict in favor of second query 550, data relevant to the "CQ Designer" component may not be provided to user 52 (e.g., the developer).

Finally, dynamic query process 10 may store 118 one or more of the first query (e.g., first query 150/450), the second query (e.g., second query 250/550), and the derivative query (e.g., derivative query 350/650). For example, storing 118 derivative query 350/650 by dynamic query process 10 may include, but is not limited to, dynamic query process 10 interfacing with, e.g., storage device 16 (where, e.g., a SQL database may be maintained) via, e.g., server computer 12 to retain data relevant to derivative query 350/650 (which may include, but is not limited to, filters 354/654).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/ or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A computer program product residing on a non-transitory computer readable medium having a plurality of instructions stored thereon which, when executed by a processor, cause the processor to perform operations comprising:
    retrieving a first query from a first user;
    retrieving a second query from a second user, wherein the second query is linked to the first query;
    generating a derivative query based, at least in part, upon merging at least a portion of the second query with at least a portion of the first query, wherein generating the derivative query includes retrieving the first query and the second query prior to generation of the derivative query;
    determining whether the derivative query contains one or more conflicts; and
    if it is determined that the derivative query contains one or more conflicts, resolving the one or more conflicts in the derivative query based upon a priority measure, wherein the priority measure assigns priority to the one or more conflicts based upon a hierarchy of the first user and the second user.

2. The computer program product of claim 1 wherein one or more of the first query, the second query, and the derivative query include one or more filters.

3. The computer program product of claim 2 wherein determining, by the computing device, whether the derivative query contains one or more conflicts includes:
    determining whether one or more of the one or more filters of the second query are incompatible with one or more of the one or more filters of the first query.

4. The computer program product of claim 2 wherein resolving, by the computing device, the one or more conflicts in the derivative query includes:
    selecting one or more of the one or more filters of the second query and the one or more filters of the first query based, at least in part, upon the priority measure.

5. The computer program product of claim 4 wherein the priority measure assigns priority to the one or more filters of the first query and the second query.

6. The computer program product of claim 1 further comprising:
    executing the derivative query, wherein executing the derivative query generates a result set.

7. The computer program product of claim 1 wherein one or more of the first query, the second query, and the derivative query are stored.

8. A computing system comprising:
    a processor;
    a memory module coupled with the processor;
    a first software module executable by the processor and the memory module, wherein the first software module is configured to retrieve a first query from a first user;
    a second software module executable by the processor and the memory module, wherein the second software module is configured to retrieve a second query from a second user, wherein the second query is linked to the first query;
    a third software module executable by the processor and the memory module, wherein the third software module is configured to generate a derivative query based, at least in part, upon merging at least a portion of the second query with at least a portion of the first query, wherein generating the derivative query includes retrieving the first query and the second query prior to generation of the derivative query;
    a fourth software module executable by the processor and the memory module, wherein the fourth software module is configured to determine whether the derivative query contains one or more conflicts; and
    if the fourth software module determines that the derivative query contains one or more conflicts,
    a fifth software module executable by the processor and the memory module, wherein the fifth software module is configured to resolve the one or more conflicts in the derivative query based upon a priority measure, wherein the priority measure assigns priority to the one or more conflicts based upon a hierarchy of the first user and the second user.

9. The computing system of claim 8 wherein one or more of the first query, the second query, and the derivative query include one or more filters.

10. The computing system of claim 9 wherein the fourth software module configured to determine whether the derivative query contains one or more conflicts is further configured to:
    determine whether one or more of the one or more filters of the second query are incompatible with one or more of the one or more filters of the first query.

11. The computing system of claim 9 wherein the fifth software module configured to resolve the one or more conflicts in the derivative query is further configured to:
    select one or more of the one or more filters of the second query and the one or more filters of the first query based, at least in part, upon the priority measure.

12. The computing system of claim 11 wherein the priority measure assigns priority to the one or more filters of the first query and the second query.

13. The computing system of claim 8 further comprising:
    a sixth software module executable by the processor and the memory module, wherein the sixth software module is configured to execute the derivative query, wherein executing the derivative query generates a result set.

14. The computing system of claim 8 further comprising:
a seventh software module executable by the processor and the memory module, wherein the seventh software module is configured to store one or more of the first query, the second query, and the derivative query.

* * * * *